United States Patent
Crowley et al.

(10) Patent No.: US 8,130,111 B2
(45) Date of Patent: Mar. 6, 2012

(54) SERVICES PORTAL

(75) Inventors: Stephen R. Crowley, Huntersville, NC (US); Cynthia A. Clear, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 601 days.

(21) Appl. No.: 11/960,469

(22) Filed: Dec. 19, 2007

(65) Prior Publication Data
US 2009/0160668 A1 Jun. 25, 2009

(51) Int. Cl.
*G08B 21/00* (2006.01)
(52) U.S. Cl. ............... 340/679; 235/379; 705/43; 902/8; 902/21
(58) Field of Classification Search .................. 340/679; 235/379; 705/43; 902/8, 21
See application file for complete search history.

(56) References Cited

U.S. PATENT DOCUMENTS

| | | | | |
|---|---|---|---|---|
| 5,867,823 | A * | 2/1999 | Richardson | 705/7.13 |
| 5,878,752 | A * | 3/1999 | Adams et al. | 131/329 |
| 5,984,178 | A | 11/1999 | Gill | |
| 6,366,782 | B1 * | 4/2002 | Fumarolo et al. | 455/457 |
| 7,080,036 | B1 | 7/2006 | Drummond et al. | |
| 7,104,441 | B2 * | 9/2006 | Shepley et al. | 235/379 |
| 7,147,147 | B1 * | 12/2006 | Enright et al. | 235/379 |
| 7,283,914 | B2 * | 10/2007 | Poorman et al. | 702/56 |
| 7,545,816 | B1 * | 6/2009 | Coutts et al. | 370/400 |
| 2002/0190861 | A1 * | 12/2002 | Wentworth | 340/568.1 |
| 2003/0058097 | A1 * | 3/2003 | Saltzstein et al. | 340/531 |
| 2003/0085927 | A1 * | 5/2003 | Muller | 345/810 |
| 2003/0163388 | A1 * | 8/2003 | Beane | 705/26 |
| 2003/0202008 | A1 * | 10/2003 | McDonald et al. | 345/736 |
| 2004/0149818 | A1 | 8/2004 | Shepley et al. | |
| 2005/0099962 | A1 * | 5/2005 | Matsuda | 370/254 |
| 2005/0216862 | A1 * | 9/2005 | Shinohara et al. | 715/825 |
| 2008/0005761 | A1 * | 1/2008 | Repasi et al. | 725/13 |
| 2008/0084324 | A1 * | 4/2008 | Wallace et al. | 340/679 |

FOREIGN PATENT DOCUMENTS

| | | |
|---|---|---|
| EP | 0712099 A | 5/1996 |
| EP | 1659548 A | 5/2006 |

OTHER PUBLICATIONS

International Search Report and Written Opinion from corresponding PCT Application No. PCT/US2008/087183, mailed on Mar. 10, 2009.

* cited by examiner

*Primary Examiner* — George Bugg
*Assistant Examiner* — Anne Lai
(74) *Attorney, Agent, or Firm* — Banner & Witcoff, Ltd.; Michael A. Springs (57) ABSTRACT

A user device may be capable of providing a service portal and feedback on the condition of the user device, such as a user device. A condition analysis of the user device may be performed by a user, such as a person or a computing device. A condition analysis may be performed to determine the physical condition and the operational condition of the user device. A condition rating may be assigned to the user device that may be commensurate with the condition analysis. The condition data and condition analysis may be entered into and stored in a data store. A maintenance action may be performed based at least in part on the condition rating. The user device may be a user device that may be operated by a financial institution or other business entity. A user may be a customer and/or an employee, vendor, or contractor of the financial institution or other business entity.

17 Claims, 5 Drawing Sheets

SERVICES PORTAL

FIELD OF THE TECHNOLOGY

Aspects of the disclosure relate to monitoring and/or servicing a user device positioned at a remote location. More specifically, aspects of the disclosure describe maintaining and providing feedback relating to the condition of a user device, such as an automated teller machine, an account management kiosk, and a cash recycler.

BACKGROUND

Recently, the financial industry adapted to its customers' evolving needs by employing automated teller machines, account management kiosks, cash recyclers, and other remotely operating user devices as portals for accessing customer accounts and transacting financial business and other related services without the need to interact with a human teller. Most often, the user devices are operated by a financial institution or other business entity and may be positioned at or near a financial institution or other business entity or may be free-standing at convenient locations for a customer (e.g., a shopping mall, office building, grocery store, or the like). The financial institution or other business entity strategically positions the user devices in locations that are likely to be frequented and utilized by customers. Many customers find these user devices convenient and often use such machines for conducting business with the financial institution or other business entity. As a result, the financial institutions or other business entities carefully monitor the condition of the user device to ensure that it is functioning properly and is properly maintained to provide a high quality customer experience.

The user devices need to be maintained, serviced, and monitored on a regular basis for cleaning, maintenance, service, and other purposes. Oftentimes, the financial institution or other business entity employs a third party vendor to provide service and maintenance to the user devices. In addition or in substitution of the third party vendor, the financial institution or other business entity may require or request that its employees monitor the condition of the user devices. When a repair or maintenance needs to be performed, the vendor or employee notifies the financial institution or other business entity of the needed action and the financial institution or other business entity then dispatches the party that will perform the repair. This process is time-consuming and prone to errors. The process also increases the amount of time that the user device operates in an undesirable condition or is inoperable and decreases the customers' satisfaction of conducting business at the user device.

In order to increase the quality of the customer interface and promote high quality banking with a financial institution or other business entity, a system and method is needed that is able to streamline the process of providing feedback to the financial institution or other business entity. Further, a system and method is needed that monitors the vendors and employees that assess the user devices to verify that the repair, maintenance, and monitoring is being performed at the standard desired by the financial institution or other business entity. Providing feedback and comments from the customers may also assist in maintaining a high quality customer interface. Therefore, a system and method is also needed that permits a vendor, customer, and employee to provide real-time or near real-time feedback to the financial institution or other business entity to streamline the service and maintenance process.

BRIEF SUMMARY OF THE INVENTION

Aspects of the present disclosure address one or more of the issues mentioned above by describing a system and method for monitoring operation of a user device. The following presents a simplified summary of the disclosure in order to provide a basic understanding of some aspects of the systems and methods of utilizing a user device as a service portal. It is not intended to identify key or critical elements of the invention nor is it intended to delineate the scope of the invention. The following summary merely presents some concepts of the disclosure in a simplified form as a prelude to the more detailed description provided below.

An aspect of the invention discloses a method of monitoring operation of a user device. The method may perform a condition analysis of the user device, which may include compiling physical condition data relating to a physical condition of the user device and compiling operational condition data relating to an operational condition of the user device. A condition rating may be determined that is commensurate with the condition analysis of the user device and is based at least in part on the physical condition data and the operational condition data. Further, an operations data store may be accessed over a computer network using a security identifier. The operations data store may be configured to store the physical condition data and the operational condition data. The physical condition data and the operational condition data may be entered into the data store based at least in part on the condition analysis of the user device. A maintenance action may be identified for the user device based at least in part on the rating of the user device.

In another aspect of the invention, a method of maintaining a user device is disclosed. The user device may be operated by a financial institution or other business entity. The method may comprise an identification module, a user interface module, a report module, and a feedback module. The identification module may be for identifying a user of the user device. The user interface module may be for displaying an assessment of a physical condition and an operational condition of the user device. The report module may be for generating a report of the assessment. The feedback module may be for providing feedback to the financial institution or other business entity. The feedback may include the assessment and the report.

In yet another aspect of the invention, a computer-readable medium may comprise computer-executable instructions to perform a method of using a user device as a service portal. A condition analysis of the user device may be performed and may include compiling physical condition data relating to a physical condition of the user device and compiling operational condition data relating to an operational condition of the user device. A condition rating may be determined that may be commensurate with the condition analysis of the user device based at least in part on the physical condition data and the operational condition data. An operations data store may be accessed over a computer network using a security identifier and may be configured to store the physical condition data and the operation condition data. The physical condition data and the operational condition data may be entered into the data store based at least in part on the condition analysis of the user device. A maintenance action for the user device may be identified based at least in part on the rating of the user device.

Another aspect of the invention discloses a system for maintaining a user device. The system may comprise a first computing device, a second computing device, and a processor. The first computing device may have a user interface and may be capable of receiving a user identification having a unique identifier. The second computing device may be coupled to the first computing device and may comprise memory having a plurality of modules. The plurality of modules may comprise computer-executable instructions and may include an identification module, a user interface module, a report module, and a feedback module. The identification module may be for recognizing the unique identifier and identifying a user of the user device by the unique identifier. The user interface module may be for displaying the user interface to the user and may be configured to receive assessment data relating to an assessment of a physical condition and an operational condition of the user device. The report module may be for generating a report of the assessment. The feedback module may be for providing feedback to a financial institution or other business entity that operates the user device, the feedback including the assessment and the report. The processor may be for executing the computer-executable instructions of the plurality of modules.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. Additional specific arrangements of parts, example devices, systems, and environments may be utilized and structural and functional modifications may be made without departing from the scope of the present invention. The various figures in this application illustrate examples of a system and method of detecting fraud. When the same reference number appears in more than one drawing, that reference number is used consistently in this specification and the drawings to refer to the same or similar parts throughout.

I. General Description of a Services Portal

In general, as described above, aspects of the invention relate to maintaining and servicing a user device, such as an automated teller machine, account management kiosk, cash recycler, or the like. In accordance with at least some aspects of the invention, a method of monitoring operation of a user device may comprise: (a) performing a condition analysis of the user device including compiling physical condition data relating to a physical condition of the user device and compiling operational condition data relating to an operational condition of the user device; (b) determining a condition rating commensurate with the condition analysis of the user device based at least in part on the physical condition data and the operational condition data; (c) assessing an operations data store over a computer network using a security identifier, the operations data store configured to store the physical condition data and the operational condition data; (d) entering the physical condition data and the operational condition data into the data store based at least in part on the condition analysis of the user device; and (e) identifying a maintenance action for the user device based at least in part on the rating of the user device.

The user device may be any electronic device that may be a user interface between a user and an operator of the user devices. For example, the user device may be an automated teller machine, account management kiosk, or cash recycler that is operated by a financial institution or other business entity or other entity. The user may conduct business, such as financial transactions, at the user device. The financial institution or other business entity may wish to monitor the operation of the user device and the maintenance or repairs that may need to be performed to maintain the level of operational and physical quality that the financial institution or other business entity desires for the user device.

A user may have access to the user device. The user may be any entity, such as a person or another computing device. The person may be an employee of the financial institution or other business entity, such as a manager or a teller. The person may also be a third party contractor of the financial institution or other business entity, such as a vendor, maintenance technician, service provider, armored truck contractor, or the like. The third party contractor may be specifically assigned to assess the condition of the user device or may be performing another service for the financial institution or other business entity in relation to the user device. The person may also be a customer that is willing to provide information relating to the condition of the user device. The user may be any entity that is capable of engaging or utilizing the user device.

In another example, the user may be a remote computing device. The remote computing device may be operated by the financial institution or other business entity and/or a third party vendor. The remote computing device may include diagnostic tools such as software that can test, service, and monitor the operational functioning of the user device. Further, the diagnostic tools may include cameras that may be remotely controlled to provide a picture or video of the physical condition of the user device.

The user may be capable of performing a condition analysis of the user device. The condition analysis may be performed on a regular basis or as needed. The condition analysis may be scheduled for regular maintenance and may also be employed at anytime, such as a randomly selected time and at the time of reporting a malfunctioning operation or broken element of the user device. The condition analysis may occur over a time period such as a day, a week, a month, and a year. The time period may represent a series of regular maintenance, follow-up repairs or tune-ups from regular use, or any other reason. For example, regular maintenance may be performed on a user device, such as a user device, once per year, regardless of the repairs performed during that same time period of a year. In essence, the regular maintenance helps to prevent elements of the user device from failing over time.

The condition analysis may include an assessment of the user device in a physical and/or operational manner. The condition analysis may include compiling physical condition data relating to a physical condition of the user device and compiling operational condition data relating to an operational condition of the user device. The physical condition of the user device may include any feature or characteristics relating to the physical appearance or function of the user device. For example, the physical condition may include the quality of the surface of the screen or user interface surfaces (e.g., an envelope bin, buttons used by customer, the organization of the deposit envelopes or other paperwork provided by the user device, and exterior appearance of the housing for the user device). The physical condition data may be any data that relates to the physical condition of the user device.

The operational condition may relate to the operation and function of the user device. The operation may include the ability of the user device to recognize a customer (i.e., through a card, fingerprint, or eye detection reader that detects a unique identifier of a user), the functionality of the software or data that is presented to the user during use of the user device, the security system, cameras, and other operational features of the user device. The operation condition data may include any data that relates to the operational condition of the user device.

The condition analysis may include the physical condition data and the operational condition data and may be performed by any entity or user, such as described above. The physical condition data and the operational condition data may be compiled to help perform the condition analysis accurately. The physical condition data and the operational condition data may be noted and/or recorded or stored by a user, such as an employee, vendor, and/or customer of the financial institution or other business entity. The condition data may be recorded in any suitable manner, such as recorded in a memory on a computing device, written down on a piece of paper, or simply noted by an individual inspecting the user device.

The condition analysis may include a visual inspection and an operational inspection of the user device. For example, the user may be an operator of the user device and/or the operations data store, a user, a service provider, a service provider or vendor, and/or a maintenance provider.

A condition rating may be determined that is commensurate with the condition analysis performed on the user device. The condition rating may be based at least partially on the condition analysis by including the physical condition data and/or the operational condition data. The condition rating may be assigned based on subjective and objective criteria. The condition rating may include a defined test of the physical and/or operational condition of the user device. In an alternative, the condition rating may include a group of testing features and/or physical condition and operational features as the analyzing entity sees fit.

The condition rating may be grouped into a plurality of condition ratings. The condition ratings may be defined by the quality of a particular feature of the user device or by the overall quality of the user device. For example, the condition rating may describe the physical condition of the keypad operated by a user during a transaction or the monitor that displays information relating to the transaction to the user. In another example, the condition rating may assign a general rating to the overall condition of the user device.

For example, three condition ratings may be available such as excellent, good, and fair. An excellent condition rating may be commensurate with a user device that may be in perfect or near-perfect condition, both physically and operationally. Good condition may reflect that the user device may have a few minor flaws that do not substantially affect the physical appearance or the operational functionality of the user device. Fair condition may be commensurate with a user device that may have several minor flaws or one or a few major flaws that devalue the physical appearance and/or the operational functionality of the user device. Each of the good and the fair condition ratings may require that the user device undergo maintenance or repair to remedy the noted flaws. In some examples, the maintenance or repair may be urgent and a repair or maintenance technician may need to be employed quickly.

In other examples, the user device may have so many minor flaws or one or more major flaws that users must be prevented from utilizing the user device. For example, a user device may have a cracked monitor and a broken card reader. Upon inspection, the user device is scheduled for immediate repair by a technician. During the period of time between dispatching a repair technician and the repair of the user device, a financial institution or other business entity operating the user device may wish to prevent customers from using the user device.

Any rating system may be employed and may be strategically defined to reflect the physical and operational condition of the user device. The rating system may have one or more categories and may request a rating for each of the categories. Such a multi-categories rating system may also be assigned a general overall rating that reflects the general condition of the user device. Further, after providing the condition rating, the entity entering the condition data may be requested or required to answer questions regarding the user device. The questions may include whether the entity recommends suspending service of the user device to the operator of the user device.

An operations data store may be accessed over a computer network using a security identifier. The operations data store may be configured to store the physical condition data and the operational condition data compiled during the condition analysis. The operations data store may also be configured to store information relating to the condition rating that may be assigned to a user device. The operations data store may be configured to store any suitable or desired information relating to the operation of the user device.

For example, the operations data store may store information relating to identifying information of the user device, such as a serial number, location, a listing of vendors and/or technicians, and the like for a user device. The user device may record and compile information relating to the frequency of use, the condition, the types of transaction conducted, and any other information relating to the user device. As described in greater detail above, the physical condition data and the operational condition data may be compiled and at least partially used during a condition analysis of the user device.

The user or entity performing the condition analysis of the user device may enter the physical condition data and the operational condition data and store the data within the operations data store. The operations data store may be accessed from a user device that may be positioned at a remote location from the operations data store. For example, a financial institution or other business entity may operate a plurality of user device, each positioned at various locations throughout a city, including a grocery store, a shopping mall, and an office building. A vendor or employee of the financial institution or other business entity may inspect the user device at the office building and determine that a repair is needed, but that customers may still be permitted to utilize the user device during the time period between the notification of the necessary repair and the point at which the repair occurs (i.e., "down time").

A maintenance action may be identified that describes a repair, maintenance, or prophylaxis that is required or desired for the user device. For example, a repair may be any feature, element, or characteristics of the user device that may need to be fixed because it is broken or otherwise inoperable. A maintenance may be a repair, tune-up, or the like to a feature, element, or characteristic of the user device that may be in need of upgrading, cleaning, resurfacing, implementing new features, minor repair that does not affect the functionality of the user device, and the like. A prophylaxis may include actions that help to prevent breakdown, damage, or other debilitating occurrences of the user device. The maintenance action may also include scheduling future maintenance or repairs and providing a report or feedback to the operator of the user device. The maintenance action may include any desired action.

For example, a user device, such as a user device, account management kiosk, or cash recycler may be operated by a financial institution or other business entity employing a manager of a branch of the financial institution or other business entity located near the user device. The manager may be required to perform a condition analysis of the user device one time per day (or any other suitable frequency) and may be required to compile physical condition data by walking around the area in which the user device may be located and making mental, written, electronic, or any other type of notes regarding the physical condition of the user device and the surrounding areas.

The manager may also be required to compile operational condition data relating to the operational functionality of the user device. The manager and/or the teller may be required to perform an operational diagnostics analysis of the software and/or the program that receives information from the manager, teller, etc. In some examples, the user device may be coupled to a computer network that may be maintained and/or operated by the financial institution or other business entity. As explained in greater detail below, the computer network may be capable of storing information relating to the user device. The user may connect to the computer network through the user device by entering a unique identifier, such as a username and password, swiping or inserting a card with a unique identifier (such as a magnetic strip, account number, picture, finger or thumb print, etc.), or any other means of verifying a user's identity. Although a verification of the user's identity is not required, it most often is utilized to prevent fraud and other unauthorized use of a user account.

The user device may have an input device (described in greater detail below) and a user interface. The user interface may be any element or function capable of interacting with a user, such as a touch-screen monitor, keypad and monitor, and the like. For example, a user device may have a touch-screen monitor for displaying a series of selections or options for a user to transact business services available through the user device. The selections may be a series of screens that request information from the user. Any desired business services may be available.

Figure 5:
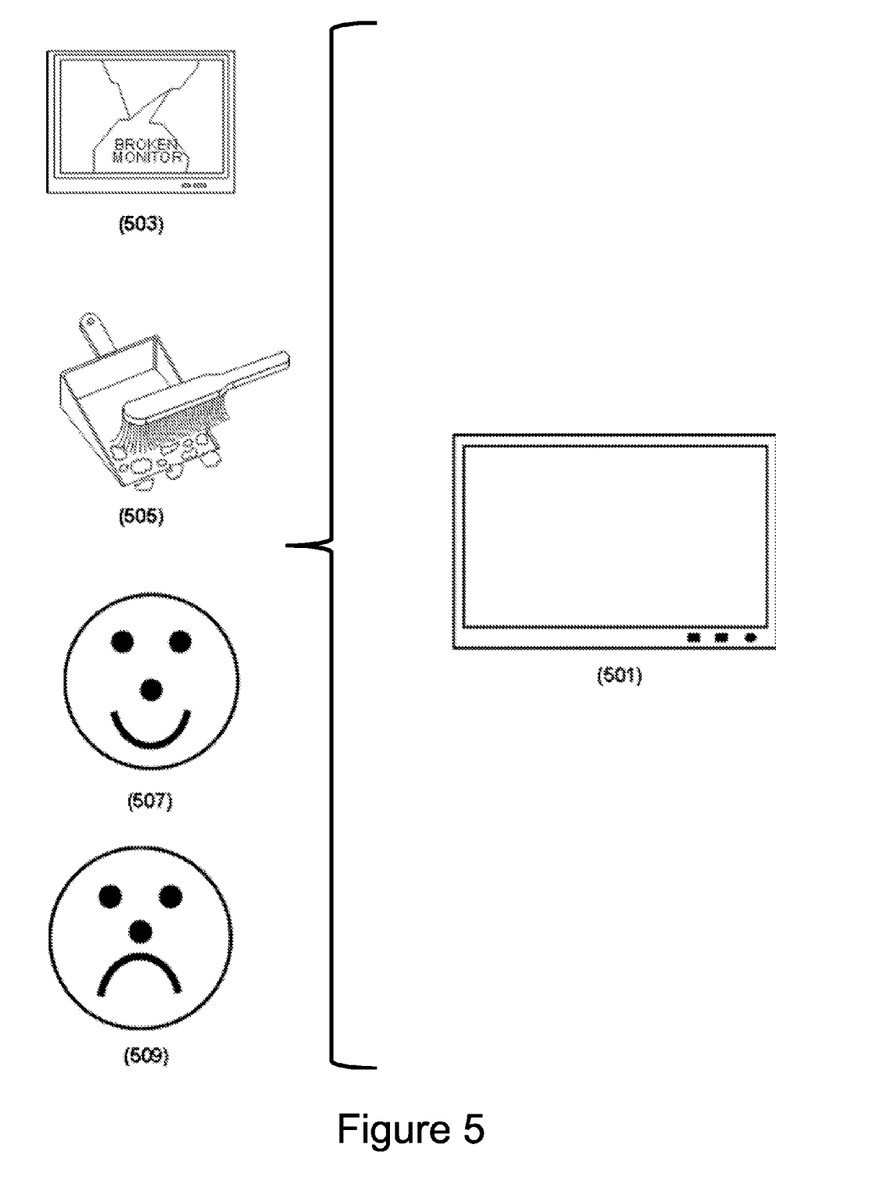
FIG. 5 illustrates various icons that may be displayed on a screen associated with the user device, according to an aspect of the invention.

FIG. 5 shows various icons that may be displayed on a screen 501 associated with the user device, according to at least one aspect of the invention. An icon or image may represent a selection that may be presented to a user on the screen. The icon or image may correspond in shape, color, or image to the selection to which is corresponds. For example, a series of icons may be associated with a condition analysis and a condition rating of a user device. The icons may be shaped and colored to represent the feedback that the user is providing. An icon 503 depicting a broken or cracked monitor of the user device may be illustrated by a broken or cracked monitor. A dirty machine may be illustrated by a cleaning symbol 505 such as cleaning products or tools. In another example, an icon 507 may depict a happy customer and may indicate that the customer may continue to use the user device during the time period after the notification and before the completion of the repair. Likewise, an icon 509 may depict an unhappy customer and may indicate that the customer may be prohibited from using the user device during the time period after the notification and before the completion of the repair. Any illustration may correspond to any suitable icon, illustration, or image.

When a maintenance action is identified, a repair entity may be dispatched to perform the maintenance action. The dispatching may be controlled by a user, an operator of the user device, a vendor or third party, a customer, a service provider, or any other entity. Oftentimes, an employee, vendor, or customer of the user device notifies the operator of the user device that a physical or operational problem exists with the user device. The problem is reported at which time a decision may be made whether to dispatch a repair entity to fix the problem. The decision to repair the user device may automatically be made when any problem is reported or may be made on a subjective basis by the entity submitting the notification of the problem. The repair entity may automatically be dispatched to perform the repair if the problem meets or exceeds a certain threshold, such as a level of seriousness (e.g., the user device is inoperable or has been vandalized). The repair entity may be dispatched in any suitable manner and at any suitable time and/or threshold.

The repair entity performs the repair and may be assessed based on the quality of the repair, the timeliness of the repair, the customer service offered, and other qualities. The performance of the repair entity may be assessed by one or more parties, including, but not limited to the operator of the user device being repaired, a customer, an employee of an operator, another vendor, the supervisor of the repair person or entity, or any other quality control person or entity. A report may be generated based at least partially on the quality of the performance of a repair of the user device. The report may be sent to the operator of the user device and may be a portion of the monitoring process performed by the operator to ensure that the user device is adequately maintained.

An operator of the user device or any other entity may be alerted when a maintenance action is requested, recommended, required, or otherwise associated with a user device. For example, a financial institution or other business entity may operate a user device. The user device may have suffered vandalism that was noted by a service provider performing routine maintenance of the user device. The service provider may perform a condition analysis and may notify the financial institution or other business entity of the vandalism to the user device. The service provider may also notify the police or law enforcement officials of the vandalism.

A report may be prepared to document and compile the information relation to the vandalism by the financial institution or other business entity and by the law enforcement officials. The report may include any information relating to the maintenance action, the condition analysis, the condition rating, or other suitable information.

The operator of a user device may be notified that a condition analysis has been performed on the user device. For example, a financial institution or other business entity may operate a user device and may be notified when a condition analysis is performed on the user device by any party, including but not limited to a customer, a vendor, a repair entity, an employee, a service provider, or the operator itself. The notification may be in the form of a report and information relating to the report may be stored and compiled to form a condition analysis history of the user device.

In another aspect of the technology, a method of maintaining a user device is disclosed. A financial institution or other business entity may operate the user device and the user device may be positioned at any suitable location. The method may comprise an identification module, a user interface module, a report module, and a feedback module. The identification module may identify a user of the user device. As described in greater detail above, the user may be identified by any suitable unique identifier, including but not limited to a username and password, a card having a unique identifier, an account number, and the like.

The user interface module may display an assessment of a physical condition and an operational condition of the user device. As described in greater detail above, the physical condition may relate to the quality of the surface, monitor, keypad, housing, or other physical features of the user device. Also described in greater detail above, the operational condition of the user device may relate to the quality of the user functionalities such as the software or the screens that may be presented to the user for entering data or providing input or analysis.

The report module may generate a report of the assessment and may include information relating to the physical condition and the operational condition of the user device. The report may organize ratings that users assigned to the user device, the frequency or type of repair, the average timer period to complete a repair after notification of the problem, demographics of the users that performed a condition analysis on the user device, and the like. The report may include any desired information relating to the user device or any other related information.

The feedback module may provide feedback to the financial institution or other business entity that includes the assessment of the user device and the report of the assessment of the user device. The feedback module may automatically generate feedback for the financial institution or other business entity after a condition analysis has been performed. The feedback may include any information relating to statistics, conditions, ratings, or other information relating to the user device.

The feedback module may also automatically update a data store that stores information that the financial institution or other business entity compiles relating to the user device. The data store may be saved on a memory located on a server or computing device operated and maintained by the financial institution or other business entity or a third party. The feedback module may trigger an update to the data store when a condition analysis is performed or a condition rating is assigned to a user device. The data store may contain current information relating to the user device.

The data store may also save information relating to statistics associated with the user device. The statistics may include frequency of use, historical condition ratings, occurrence of vandalism, crimes rates of the neighborhood, demographics of the neighborhood, currency balances required to adequately service customer requests, and the like. The statistics may include any desired information relating to the user device and its location or neighborhood in which it is positioned.

In yet another aspect of the technology, a computer-readable medium may comprise computer-executable instructions to perform a method of servicing a user device, such as an automated teller machine, an account management kiosk, a cash recycler, or the like. The method may comprise: (a) performing a condition analysis of the user device including compiling physical condition data relating to a physical condition of the user device and compiling operational condition data relating to an operational condition of the user device; (b) determining a condition rating commensurate with the condition analysis of the user device based at least in part on the physical condition data and the operational condition data; (c) accessing an operations data store over a computer network using a security identifier, the operations data store configured to store the physical condition data and the operational condition data; (d) entering the physical condition data and the operational condition data into the data store based at least in part on the condition analysis of the user device; and (e) identifying a maintenance action for the user device based at least in part on the rating of the user device.

In another aspect of the technology, a system is disclosed for maintaining a user device. The system may comprise a first computing device, a second computing device, and a processor. The first computing device may have a user interface and may be capable of receiving a user identification having a unique identifier. For example, the first computing device may be an automated teller machine, an account management kiosk, or the like located at a shopping mall and usable by the public. Each customer may be required to insert a card having a unique identifier, such as a magnetic strip, fingerprint, account number, or the like, to be permitted to access a customer account associated with the customer (and the unique identifier). The user device may have a card reader for receiving the customer's card and extracting the unique identifier from the card. The card reader may send the unique identifier through a verification process and may confirm that the user may be authorized to access the customer account.

A second computing device may be coupled to the first computing device and may comprise memory having a plurality of modules comprising computer-executable instructions. The second computing device may be a server or other computer or group of networked computing devices that may store information relating to the user devices. The second computing device may be operated and maintained by the financial institution or other business entity (or operator of the user device), a vendor, a service provider, a repair technician, or any other suitable entity.

The second computing device may store a plurality of modules. Each module may contain computer-executable instructions, such as portions of an application or other software that may cause an action to occur on one or more computing devices, as described in greater detail below. In an aspect, the modules may include an identification module, a user interface module, a report module, and a feedback module. The identification module may recognize a unique identifier and identify the user's identity by the unique identifier. As described in greater detail above, the unique identifier may be a card having a magnetic strip, account number, finger or thumb print, or any other unique identifying feature.

The user interface module may display the user interface to the user and may be configured to receive assessment data relating to an assessment of a physical condition and an operational condition of the user device. The user interface module may include a user interface that may be presented to the user and may receive input from the user, as described in greater detail above. The user interface module may be configured to receive assessment data. The assessment data may include information relating to the quality of the condition of the user device. For example, assessment data may provide a rating or conclusion regarding the physical condition of the user interface, such as the monitor, keypad, housing, etc. The assessment may be a compilation of data or facts relating to the user device, the area surrounding the user device, and/or the neighborhood, demographics, usage, or the like of the user device.

The report module may generate a report of the assessment and may be in any suitable form, as described above. The feedback module may provide feedback to a financial institution or other business entity operating the user device, including but not limited to information relating to the physical or operational condition, the area surrounding, and/or the neighborhood, demographics, frequency of usage, or other desired information relating to the user device. The feedback may include the assessment and the report and may continuously update the modules stored on the second computing device.

II. Specific Examples of an Operations Monitor

Figure 1:
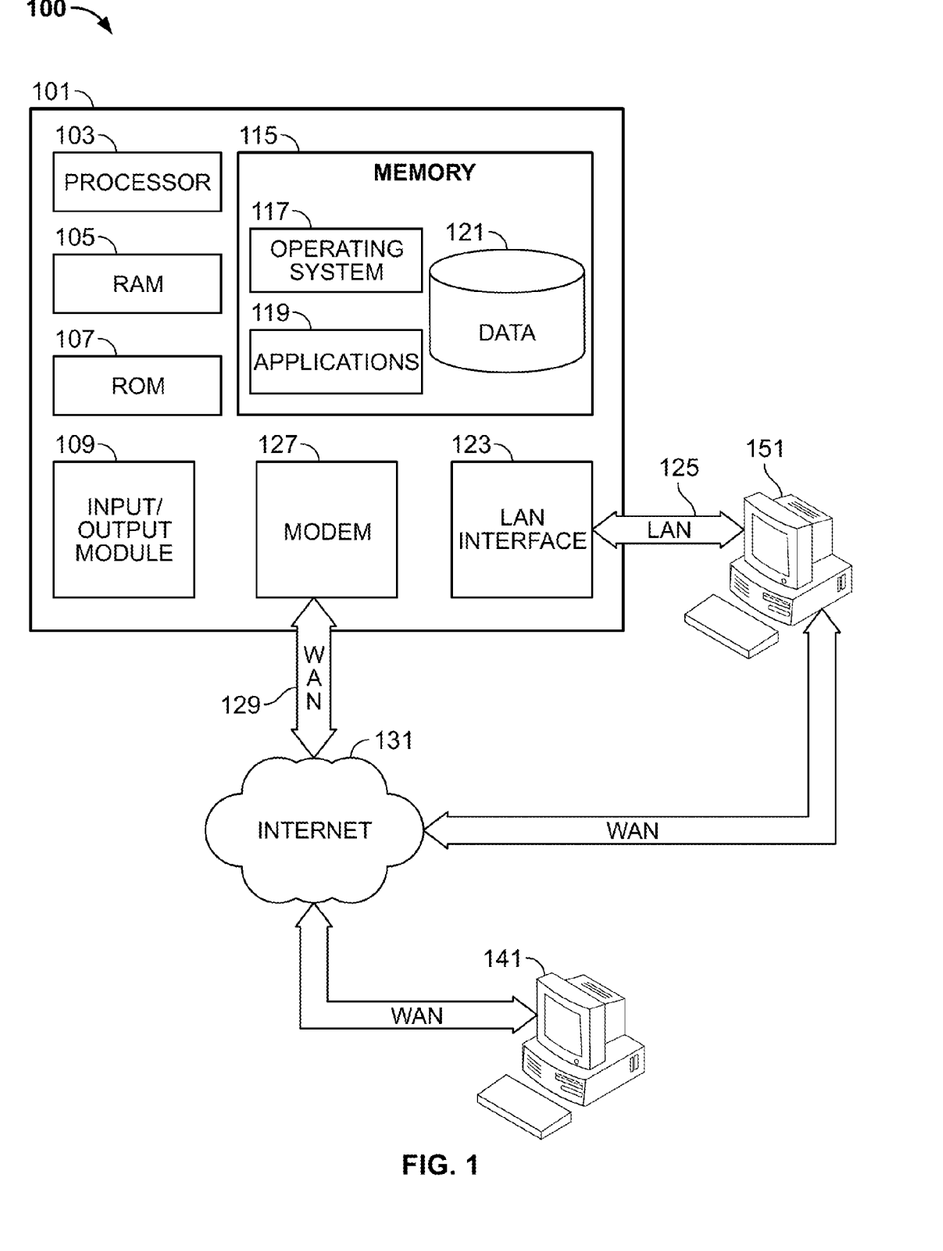
FIG. 1 illustrates a computing system in accordance with an aspect of the invention.

The system and method of monitoring operations of a user device may be embodied in a computing system environment. FIG. 1 illustrates an example of a computing system environment 100 that may be used according to one or more embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of the illustrated components.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, an input/output module or BIOS 109, and a memory 115. The computer 101 typically includes a variety of computer readable media. The computer readable media may be any available media that may be accessed by the computer 101 and may include both volatile and nonvolatile media and removable and non-removable media. By way of example, and not limitation, computer readable media may comprise computer storage media and communication media.

Computer storage media may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 101.

Communication media may embody computer readable instructions, data structures, program modules, and/or other data in a modulated data signal such as a carrier wave or other transport mechanism. The communication media may also include any information delivery media. A modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media. Although not shown, RAM 105 may include one or more applications representing the application data stored in RAM 105 while the computer is on and corresponding software applications (e.g., software tasks) are being executed.

The input/output module or BIOS 109 may include a microphone, keypad, touch screen, and/or stylus through which a user of the computer 101 may provide input. The input/output module or BIOS 109 may also include one or more of a speaker for providing audio output and a video display device for providing textual, audiovisual, and/or graphical output. Any BIOS 109 may be employed to provide a user interface.

Software may be stored within memory 115 and/or storage to provide instructions to the processor 103 for enabling the computer 101 to perform various functions. For example, the memory 115 may store software used by the computer 101, such as an operating system 117 and an associated data file 121. Alternatively, some or all of the computer executable instructions for the computer 101 may be embodied in hardware or firmware (not shown). As described in detail below, the data file 121 may provide centralized storage of data.

The computer 101 may operate in a networked environment that supports connections to one or more remote computers, such as computing devices 141 and 151. The computing devices 141 and 151 may be personal computers or servers that include many or all of the elements described above relative to the computer 101. The network connections depicted in FIG. 1 may include a local area network (LAN) 125 and a wide area network (WAN) 129 and may also include other networks. The computer 101 is connected to the LAN 125 through a network interface or adapter 123. The computer 101 may be a server and may include a modem 127 or other means for establishing communications over the WAN 129. For example, the computer 101 may connect to a WAN 129 such as the Internet 131 through a modem connection. The network connections may include any communications link between computers.

The existence of any of various well-known protocols such as TCP/IP, Ethernet, FTP, HTTP, and the like is presumed, and the system can be operated in a client-server configuration to permit a user to retrieve web pages from a web-based server. Any of various conventional web browsers can be used to display and manipulate data on web pages.

Additionally, an application program may be used by the computer 101 according to an embodiment of the invention. The application program may include computer executable instructions for invoking user functionality related to communication, such as email, short message service (SMS), and voice input and speech recognition applications.

The computing devices 141 or 151 may also be mobile terminals including various other components, such as a battery, speaker, and antennas (not shown). The input/output module or BIOS 109 may include a user interface including such physical components as a voice interface, one or more arrow keys, joystick, data glove, mouse, roller ball, touch screen, or the like.

Each of the plurality of computing devices 141, 151 may contain software for creating a data file 121. The software may be a set of detailed computer-executable instructions for the computing devices 141, 151. The software may provide the computing devices 141, 151 with the ability to create a data file 121. The data file 121 may contain multiple individual files of information. For example, a plurality of user devices may be operated by a financial institution or other business entity and information relating to each user device may be received onto a computer network. The information relating to each user device may be separately contained in a unique data file 121. One or more of the data files relating to a plurality of user devices may be coupled to each other in any suitable fashion.

The computer 101 may include memory 115 for storing computer-readable instructions and a processor 103 for executing the computer-executable instructions. The computer-executable instructions may be data in the form of program source code that may be capable of modifying the data file 121. The computer-executable instructions may be a series or sequence of instructions for a computing device that is typically in the form of a programming language such as C++, Java, SQL, or the like. Various computer programming languages may be used to create the computer-executable instructions, and the invention is not limited to the programming languages listed above.

The memory 115 may be a portion of the computer 101 that stores data or other instructions. The memory 115 may be retained or lost when power is lost to the system. The memory 115 may provide access to data for a user or computing device 141, 151 to revise and manage a data file 121.

The processor 103 may be capable of executing the computer-executable instructions. The computer-executable instructions may be executed by the processor 103 after they have been stored in the memory 115. The processor 103 may be a centralized element within a computing system that is capable of performing computations. For example, the processor 103 may perform the computations that are described in the computer-executable instructions and then execute the computer-executable instructions. The computer-executable instructions may include data describing changes to the data file 121 that were made by a user or computing device 141, 151 over a computer network such as the Internet 131. The computer 101 stores the data in the data file 121 that may be associated with a user device. The data file 121 may be stored in the memory 115 so that it may be accessible to a plurality of computing devices 141, 151 and/or users.

Data relating to a user device may be stored in the data file 121. Security precautions may be implemented to prevent unauthorized access to the data file 121. A user identification and a password may be required to access the data file 121 and/or the data relating to the user device. Some of the data that is stored in the data file 121 may be shared between multiple data files. Any desirable security precautions may be implemented.

The computer-executable instructions may be a series or sequence of instructions for a computing device 141, 151, described in detail throughout this disclosure. The processor 103 may be configured to execute the computer-executable instructions that may be used to service a user device. Such computer-executable instructions may be located (e.g., physically or logically) in modules in the memory 115. The computer network 131 may be any network that interconnects users and/or computing devices 141, 151. According to at least one aspect of the invention, the computer network 131 may provide shared access by two computing devices to at least a portion of the data in the plurality of modules. Shared access may be two or more computing devices 141, 151 that may be coupled to the computer network 131 and/or that may be able to communicate with each other and/or access, change, and add data to a data file 121.

A computer network such as the Internet 131 provides access to the date file 121 that may be shared between the computing devices 141, 151. Additionally, the computer network may be public or private and may be wired or wireless. The computing devices 141, 151 that are coupled to the computer network may be any electronic device that is capable of connecting to a computer network and transmitting data over the computer network. Further, the computing devices are capable of receiving data for entry into a data file 121 that may be associated with servicing a user device.

Figure 2:
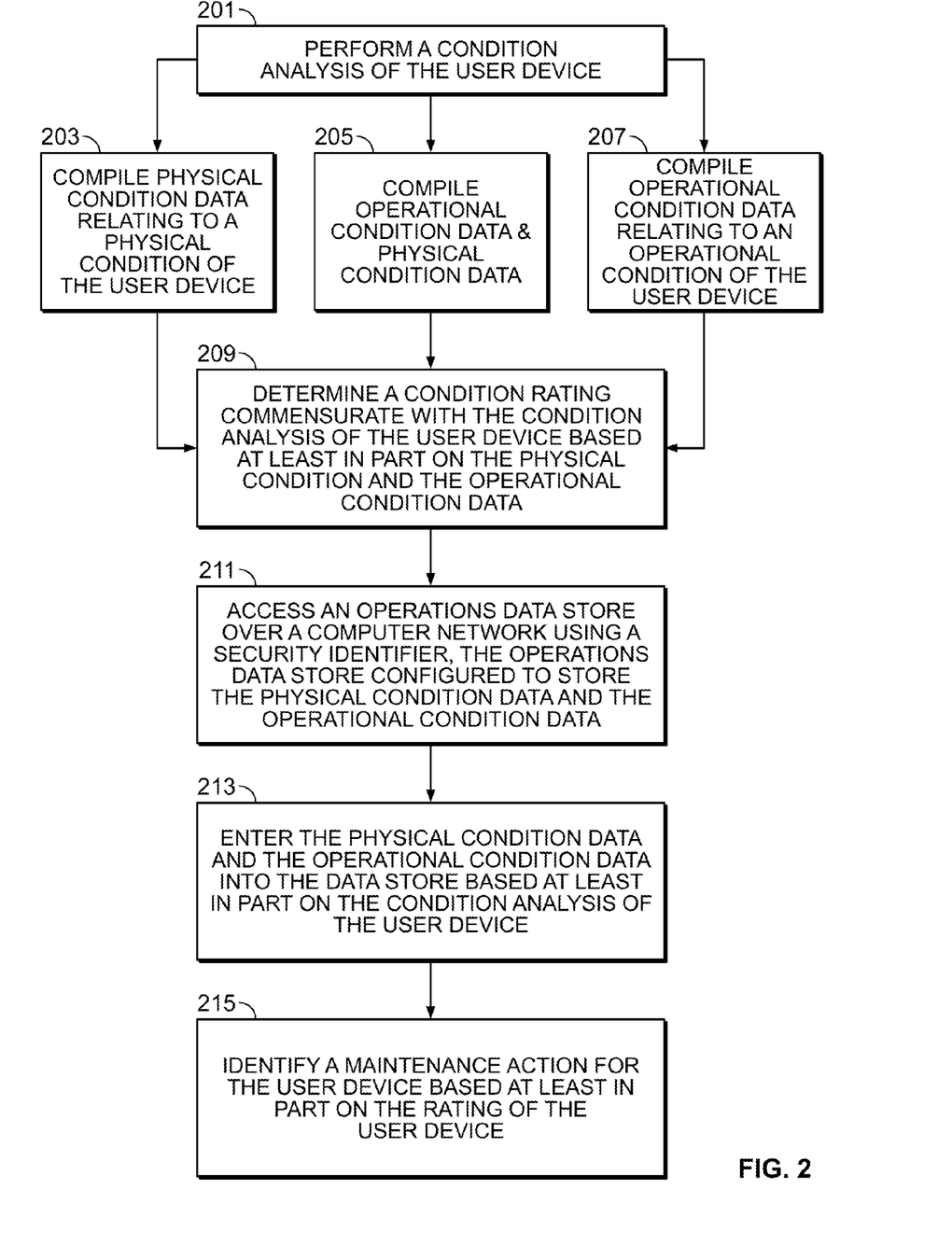
FIG. 2 is a flowchart illustrating a method of monitoring operations of a user device, in accordance with an aspect of the invention.

FIG. 2 illustrates a method of maintaining a user device, according to an aspect of the technology. A condition analysis of the user device may be performed, as illustrated in step 201. Physical and operational condition data may be compiled, as illustrated in step 205. In some examples and as illustrated in FIG. 2, physical condition data may be compiled without operational condition data, as illustrated in step 203. Step 207 illustrates that operational condition data may be compiled without compiling the physical condition data. Any combination of compiling data may be performed.

The condition analysis performed in step 201 may include analyzing the physical and operational quality of the user device, as described in greater detail above. A condition rating may be determined that may be commensurate with the condition analysis, as shown in step 209. The condition rating may be based at least in part on the physical condition and the operational condition data that may be compiled about the user device.

An operations data store may be accessed over a computer network, as shown in step 211. The operations data store may be operated or maintained by the operator of the user device or any other suitable third party. A unique identifier may be required to access the operations data store. The unique identifier may be a security identifier and may be assigned to a user account. The user account may have one or more authorized users. In many circumstances, the user account may be accessed only by an authorized user of the user account. The user account may be accessed by an authorized user at a user device, such as a user device.

The operations data store may be configured to store the physical condition data and the operational condition data that may be compiled by a user or third party. The physical condition data may describe the quality of the physical portions of the user device. The operational condition data may describe the quality of the operations (i.e., the software or user interface screens) of the user device.

The physical condition data and the operational condition data may be entered into the data store and may be based at least in part on the condition analysis of the user device, as illustrated in step 213. A maintenance action may be identified based at least in part on the condition rating of the user device, as shown in step 215. The maintenance action may be a repair, scheduled maintenance, prophylaxis, or the like for the user device and may be performed by a repair technician or any other suitable entity.

Figure 3:
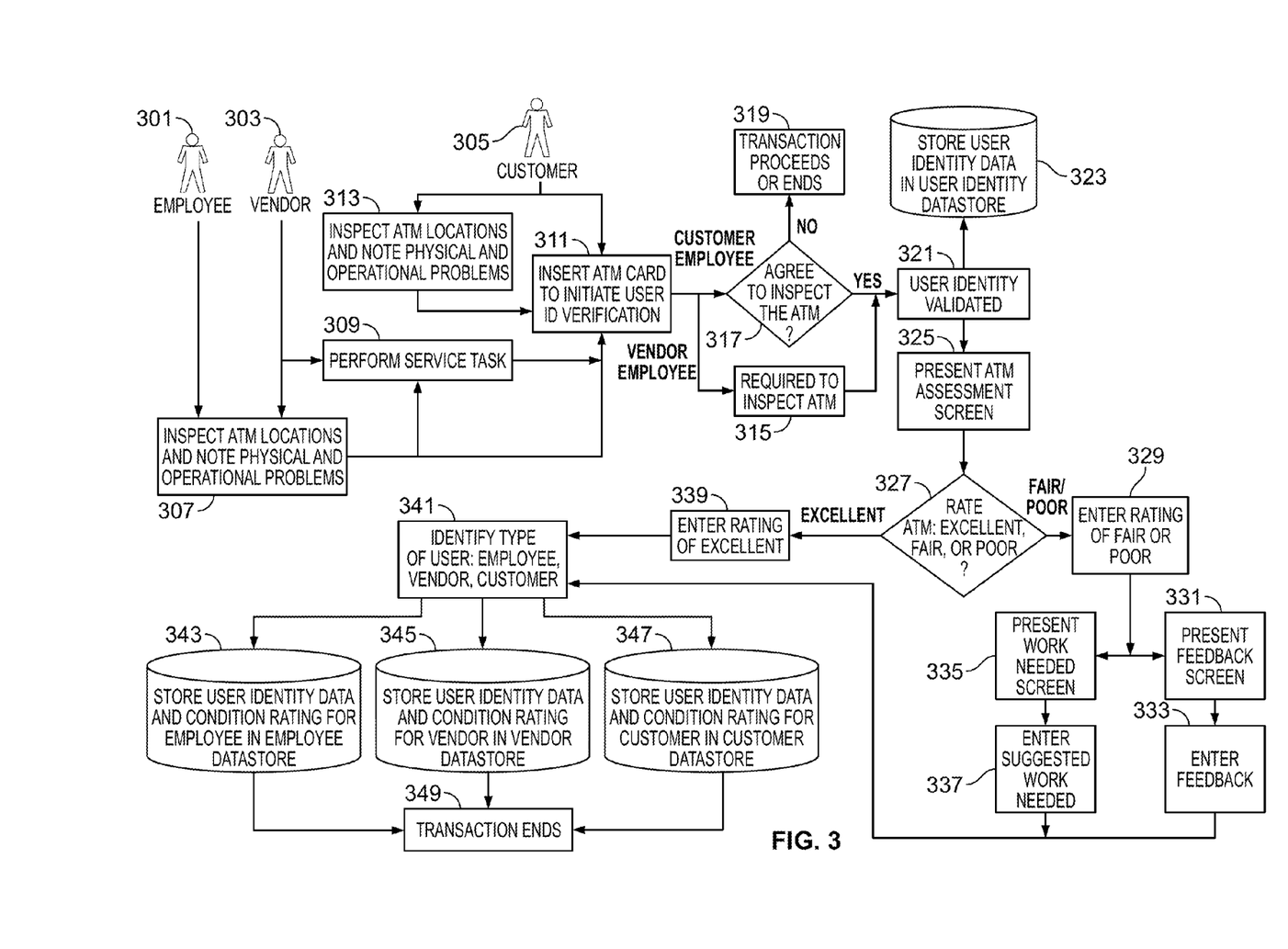
FIG. 3 is a flowchart illustrating a method of servicing and maintaining a user device, according to an aspect of the invention.

FIG. 3 illustrates a method of using a user device as a service portal. An employee 301, a vendor 303, and a customer 305 may each provide feedback, assess and/or identify a problem, rate the quality, repair, or any other action associated with the user device. The employee 301 may be a manager, teller, or any other employee, representative, and/or contractor that may be associated with or employed by the financial institution or other business entity. The vendor 303 may be any third party entity that services, maintains, operates or is otherwise associated with the user device. The vendor 303 may be a service provider, a repair technician, a maintenance provider, or the like.

The employee 301, the vendor 303, and the customer 305 may inspect the user device locations and note the physical and operational problems that may be associated with the user device 307, 313. The employee 301 and/or a vendor 303 may be required to perform a service task 309 upon inspecting the user device. For example, the service task may include performing a diagnostics test on the operational functionality of the user device and/or visually inspecting the user device for visible flaws and the like.

In some examples, the employee 301, the vendor 303, and/or the customer 305 (the "user"), may have a user device card that is capable of being received by the user device. The user device card may be inserted into the user device to initiate verification of the user's identification 311. If the user is a customer 305 or an employee 303 (such as a teller or other employee without management responsibilities), the user may be asked to agree to inspect the user device 317. In this case, the user may not have a vendor, management, or other type of responsibility to inspect the user device. If the user declines to inspect the user device, the transaction may end or the business portion of the transaction may proceed 319 without an inspection.

A user identified as a vendor 303 and/or an employee 301 having inspection and/or management responsibilities may be required to inspect the user device and provide data and/or feedback relating to the user device's physical and operational condition and/or the surrounding physical area 315. The user identify is validated 321 regardless of whether the user is an employee 301, a vendor 303, and/or a customer 305. Data relating to the identity of the user providing inspection data may be stored in a user identity data store 323. The user identity data may include the name and contact information of the user, the time and date of the inspection, and the location and identifying information relating to the user device being analyzed.

Any user either agreeing to or required to provide assessment information relating to the user device may be presented with a user device assessment screen 325. The user device assessment screen may include questions, tests, comments, or any other information relating to the physical and operational condition of the user device (and other related information). The user device assessment screen may request that the user enter a rating of one or more features or the overall quality of the user device 327.

The user may enter a rating of excellent for the user device 339. A rating of excellent may be commensurate with a perfect or near-perfect physical and operational condition of the user device. The type of user may be identified and noted 341, such as an employee 301, a vendor 303, and a customer 305. If the user is an employee, the user identity information and condition rating assigned by the employee to the user device may be stored in an employee data store 343. If the user is a vendor, the user identity information and the condition rating may be stored in a vendor data store 345. If the user is a customer, the user identity data and the condition rating may be stored in a customer data store 347. After the rating of excellent is stored in at least one of the employee, vendor, and/or customer data store, the transaction may end 349.

The user may enter a rating of fair or poor for the user device 329. In an aspect, the user may then be presented with a work needed screen 335 that asks questions and requests information of the user that relates to possible work, repairs, maintenance, or the like that may be recommended or required. The user may enter information or answer questions that suggest that work may be required to maintain the user device at a suitable quality 337.

The user may also be presented with a feedback screen 331. The feedback screen may include information, questions, tests, comments, or the like that relate to providing feedback to the operator of the user device (i.e., the financial institution or other business entity). The user may enter information or answer questions that provide such feedback to the financial institution or other business entity. The feedback screen may be presented to the user in addition to or in substitution of the work needed screen. The work needed and the feedback screens may be presented to the user in any suitable order.

When a condition rating of fair or poor for the user device may be entered, the type of user may be identified 341. The user identity data and the assigned condition rating may be stored in the employee, vendor, and/or customer data store commensurate with the type of user entering the data 343, 345, and 347.

Figure 4:
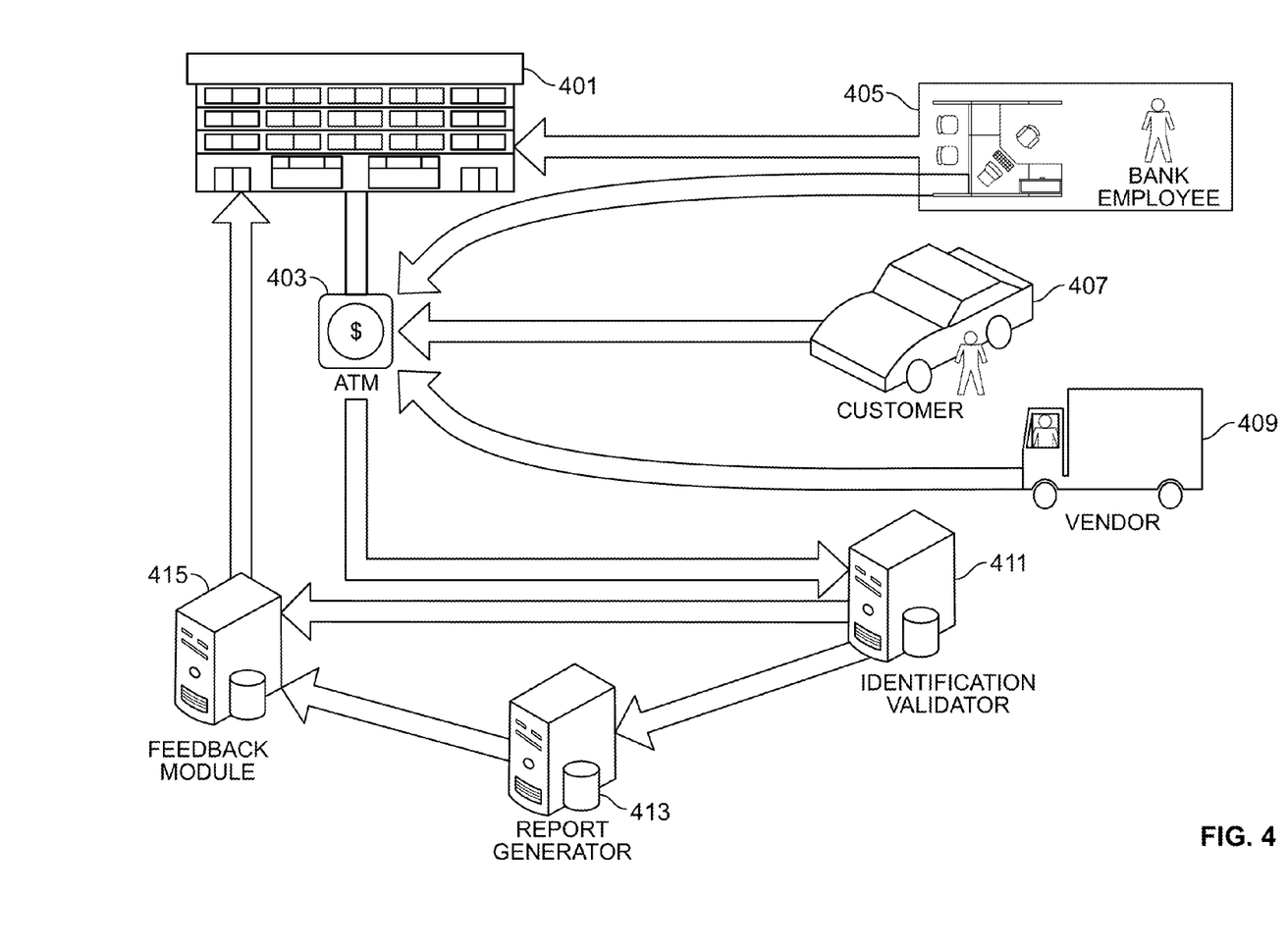
FIG. 4 illustrates a system for maintaining a user device, according to an aspect of the invention.

FIG. 4 illustrates a system for maintaining a user device. A financial institution or other business entity 401 may operate an automated teller machine (ATM) 403. A financial institution or other business entity employee 405, such as a manager, may be assigned the task of inspecting the ATM. Oftentimes, the financial institution or other business entity employee 405 may perform a visual inspection and may physically walk around the ATM and visually inspect the ATM and the surrounding area.

A customer of the financial institution or other business entity 407 may also inspect the ATM and the surrounding area. In most circumstances, the customer 407 will be asked to participate in the inspection before an assessment is performed (the customer is not required to participate in the assessment). Customers 407 may arrive at the ATM via foot and/or vehicle. Some vendors 409 may be required to provide feedback and others may be requested to provide feedback. The vendors 409 may arrive at the ATM to service the ATM or to perform other tasks for the ATM or the financial institution or other business entity.

Each user's identification may be validated by an identification validator 411, such as a card reader for an ATM card, a user name and password, or any other security validation technique. Once the user's identity is validated, the user may provide feedback to the financial institution or other business entity through a feedback module 415 such as a touch screen monitor or a keypad, as described in greater detail above. The user may also request that a report may be generated by a report generator 413. The feedback and the report may include information relating to the user's experience utilizing the ATM, the physical and/or operation condition or quality of the ATM, and the like.

Aspects of the invention have been described in terms of illustrative embodiments thereof. Numerous additional embodiments, modifications, and variations may exist that remain within the scope and spirit of the appended claims. For example, the steps illustrated in the figures may be performed in other than the recited order and that one or more steps illustrated may be optional. The methods and systems of the above-referenced embodiments may also include other additional elements, steps, computer executable instructions, or computer-readable data structures. In this regard, other embodiments are disclosed herein as well that can be partially or wholly implemented on a computer readable medium, for example, by storing computer executable instructions or modules or by utilizing computer readable data structures.

We claim:

1. A method of monitoring operation of a user device, comprising:
    performing a condition analysis of the user device including compiling physical condition data relating to a physical condition of the user device and compiling operational condition data relating to an operational condition of the user device;
    determining a condition rating commensurate with the condition analysis of the user device based at least in part on the physical condition data and the operational condition data,
    wherein the condition rating is represented by one of a plurality of icons,
    wherein at least one of the plurality of icons is chosen from the group consisting of: a broken monitor icon used to depict a broken monitor of the user device, a cleaning symbol icon used to depict a dirty user device, a happy customer icon used to depict that a customer can continue to use the user device during a time period before completion of a repair to the user device, and an unhappy customer icon used to depict that the customer is prohibited from using the user device before completion of the repair to the user device;
    accessing an operations data store over a computer network using a security identifier;
    storing the physical condition data and the operational condition data in the data store based at least in part on the condition analysis of the user device;
    receiving identification of a maintenance action for the user device based at least in part on the rating of the user device;
    dispatching a repair entity to perform the maintenance action; and
    receiving an assessment of the performance of the repair entity,
    where the user device is at least one of an automated teller machine, an account management kiosk, and a cash recycler.

2. The method of claim 1, where the method of monitoring operation of a user device occurs over a time period.

3. The method of claim 2, where the time period is one of a day, a week, a month, and a year.

4. The method of claim 1, where the operations data store is operated by a financial institution or other business entity.

5. The method of claim 1, where the condition analysis includes performing at least one of a visual inspection and an operational inspection.

6. The method of claim 1, where the condition analysis is performed by at least one of an operator of the operations data store, a user, a service provider, and a maintenance provider of the user device.

7. The method of claim 1, where the security identifier is at least one of an identification card having a unique identifier and a username and password.

8. The method of claim 1, where the physical condition data and the operational condition data are entered into the data store through a user interface on the user device.

9. The method of claim 8, where the user interface includes an image depicting the condition rating.

10. The method of claim 1, where the maintenance action is one of a repair, a routine maintenance, and a preventative maintenance.

11. The method of claim 1, further comprising automatically notifying an operator of the user device when the condition analysis is performed on the user device.

12. The method of claim 1, further comprising alerting an operator of the user device of the maintenance action.

13. The method of claim 1, further comprising generating a report of the condition analysis of the user device.

14. A method of maintaining a user device operated by a business entity, comprising:
    an identification module for identifying a user of the user device;
    a user interface module for displaying an assessment of a physical condition and an operational condition of the user device, wherein the assessment includes a condition rating and wherein the condition rating is represented by one of a plurality of icons,
    wherein at least one of the plurality of icons is chosen from the group consisting of: a broken monitor icon used to depict a broken monitor of the user device, a cleaning symbol icon used to depict a dirty user device, a happy customer icon used to depict that a customer can continue to use the user device during a time period before completion of a repair to the user device, and an unhappy customer icon used to depict that the customer is prohibited from using the user device before completion of the repair to the user device;
    a report module for generating a report of the assessment; and
    a feedback module for providing feedback to the business entity, the feedback including the assessment and the report, wherein the feedback results in dispatching a repair entity to perform a maintenance action and wherein the performance of the repair entity is assessed.

15. A non-transitory computer-readable medium comprising computer-executable instructions to perform a method, comprising:
    performing a condition analysis of a user device including compiling physical condition data relating to a physical condition of the user device and compiling operational condition data relating to an operational condition of the user device;
    determining a condition rating commensurate with the condition analysis of the user device based at least in part on the physical condition data and the operational condition data,
    wherein the condition rating is represented by one of a plurality of icons,
    wherein at least one of the plurality of icons is chosen from the group consisting of: a broken monitor icon used to depict a broken monitor of the user device, a cleaning symbol icon used to depict a dirty user device, a happy customer icon used to depict that a customer can continue to use the user device during a time period before completion of a repair to the user device, and an unhappy customer icon used to depict that the customer is prohibited from using the user device before completion of the repair to the user device; the user device,
    accessing an operations data store over a computer network using a security identifier;
    storing the physical condition data and the operational condition data into the data store based at least in part on the condition analysis of the user device;
    receiving identification of a maintenance action for the user device based at least in part on the rating of the user device;
    dispatching a repair entity to perform the maintenance action; and receiving an assessment of the performance of the repair entity.

16. A system for maintaining a user device, comprising:
a first computing device having a user interface and capable of receiving a user identification having a unique identifier;
a second computing device coupled to the first computing device, the second computing device comprising memory having a plurality of modules comprising computer-executable instructions, including:
an identification module for recognizing the unique identifier and identifying a user of the user device by the unique identifier;
a user interface module for displaying the user interface to the user, the user interface configured to receive assessment data relating to an assessment of a physical condition and an operational condition of the user device wherein the assessment includes a condition rating,
wherein the condition rating is represented by an icona plurality of icons,
wherein at least one of the plurality of icons is chosen from the group consisting of: a broken monitor icon used to depict a broken monitor of the user device, a cleaning symbol icon used to depict a dirty user device, a happy customer icon used to depict that a customer can continue to use the user device during a time period before completion of a repair to the user device, and an unhappy customer icon used to depict that the customer is prohibited from using the user device before completion of the repair to the user device;
a report module for generating a report of the assessment; and
a feedback module for providing feedback to a business entity that operates the user device, the feedback including the assessment and the report, wherein the feedback results in dispatching a repair entity to perform a maintenance action and wherein the performance of the repair entity is assessed,
and
a processor for executing the computer-executable instructions.

17. A method of monitoring operation of an automated teller machine over a time period, comprising:
performing a condition analysis of the automated teller machine including compiling physical condition data relating to a physical condition of the automated teller machine by visually inspecting the automated teller machine using cameras that are configured to be remotely controlled to provide a video of the physical condition of the automated teller machine and compiling operational condition data relating to an operational condition of the automated teller machine,
wherein the operational condition data relates to software that is presented to a user during use of the automated teller machine;
compiling the physical condition data and the operational condition data;
notifying an operator of the automated teller machine when the condition analysis is performed;
determining a condition rating commensurate with the condition analysis of the automated teller machine based at least in part on the physical condition data and the operational condition data,
wherein the condition rating is represented by one of a plurality of icons,
wherein the plurality of icons are shaped and colored to represent the condition rating,
wherein an icon showing a broken monitor is used to depict a broken monitor of the automated teller machine,
wherein an icon showing a cleaning symbol is used to depict a dirty automated teller machine,
wherein a condition rating of good means that the automated teller machine has only a few minor flaws that do not affect the physical condition and the operational condition of the automated teller machine,
wherein a condition rating of fair means that the automated teller machine has several minor flaws or one or a few major flaws,
wherein a condition rating of excellent means that the automated teller machine is in perfect or near-perfect condition;
accessing an operations data store operated by a financial institution over a computer network using an identification card having a username and password, the operations data store configured to store the physical condition data and the operational condition data into the data store based at least in part on the condition analysis of the automated teller machine,
wherein the operations data store further stores a serial number, location, and list of vendors for the automated teller machine,
receiving identification of a repair for the automated teller machine based at least in part on the rating of the automated teller machine,
wherein the repair relates to a feature of the automated teller machine that is broken;
alerting the operator of the automated teller machine of the repair;
dispatching a repair entity to perform the repair;
receiving an assessment of the performance of the repair entity based on a quality of the repair and a timeliness of the repair; and
generating a report that includes the conditional analysis of the automated teller machine, a frequency of the repair, an average time period to complete the repair; and demographics of users that performed the condition analysis.

* * * * *

UNITED STATES PATENT AND TRADEMARK OFFICE
CERTIFICATE OF CORRECTION

PATENT NO. : 8,130,111 B2  Page 1 of 1
APPLICATION NO. : 11/960469
DATED : March 6, 2012
INVENTOR(S) : Stephen R. Crowley et al.

It is certified that error appears in the above-identified patent and that said Letters Patent is hereby corrected as shown below:

Column 18, Claim 15, Line 57:
Please delete "the user device,"

Column 19, Claim 16, Line 21:
Please delete "an icona" and insert -- a --

Signed and Sealed this
Tenth Day of July, 2012

David J. Kappos
*Director of the United States Patent and Trademark Office*